Sept. 5, 1950     O. H. GITTER     2,521,003
TUBE CUTTING MACHINE
Filed Oct. 14, 1946     2 Sheets-Sheet 1
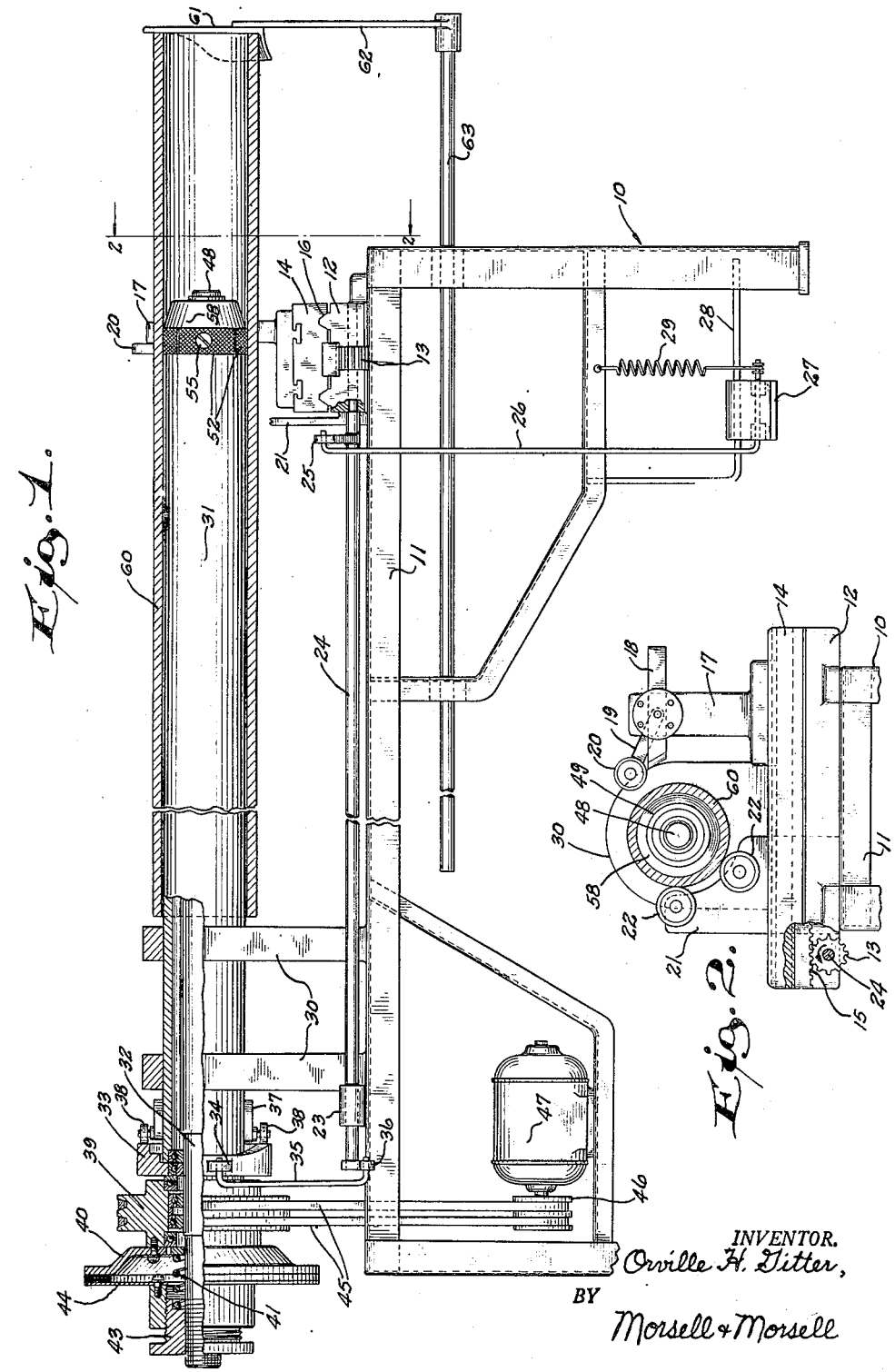
INVENTOR.
Orville H. Gitter,
BY
Morsell & Morsell
ATTORNEYS.

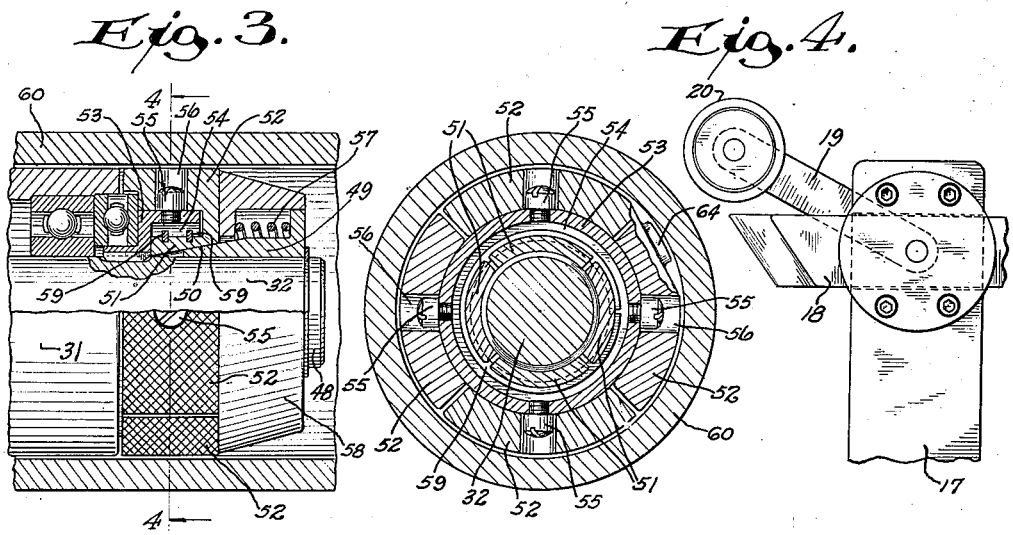
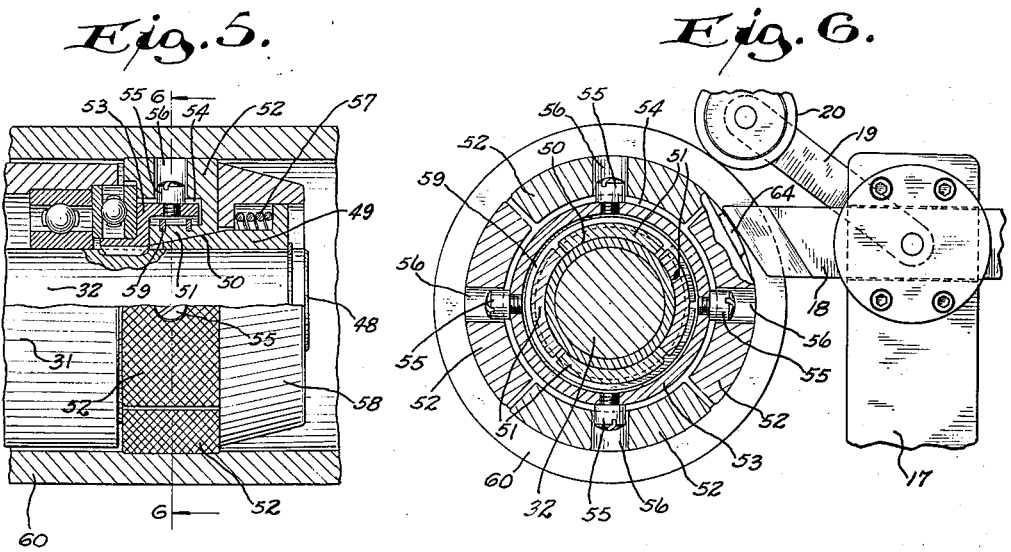

Patented Sept. 5, 1950

2,521,003

UNITED STATES PATENT OFFICE 2,521,003

TUBE CUTTING MACHINE

Orville H. Gitter, Appleton, Wis., assignor to Appleton Mfg. Co., Appleton, Wis., a corporation of Wisconsin Application October 14, 1946, Serial No. 703,183

13 Claims. (Cl. 164—38)

This invention relates to improvements in tube cutting machines, and more particularly to a machine which is adapted to receive an elongated extent of tubing of paper board or the like, and which functions to cut said elongated tubing into shorter tubes of desired uniform lengths.

A general object of the invention is to provide a paper tube cutting machine which produces smoothly and evenly severed tubes of a desired length with uniformity of operation.

A more specific object of the invention is to provide a tube cutting machine, the operation of which is entirely controlled by a single foot pedal and which eliminates the need of experienced operators.

A further object of the invention is to provide a tube cutting machine wherein the tubing to be cut is mounted on a mandrel equipped with expanding jaws to releasably engage the interior of the tubing stock.

A further object of the invention is to provide a tube cutting machine wherein the knife or cutter, in operating, engages a hard tungsten-carbide pad to insure a metal to metal contact in the cutting operation to thereby provide cleanly severed edges on the individual tubes.

A further object of the invention is to provide a tube cutting machine in which the mechanism, upon movement of the knife to an inoperative position, automatically effects release of the stock.

A further object of the invention is to provide a tube cutting machine wherein the stock to be cut is rotated on a mandrel and is engaged with a knife which is reciprocated into and out of the stock.

A further object of the invention is to provide a tube cutting machine which operates easily and very expeditiously, which is strong and durable, which is simple and relatively inexpensive to manufacture, and which is well adapted for the purposes described.

With the above and other objects in view, the invention consists of the improved tube cutting machine and its parts and combinations as set forth in the claims, and all equivalents thereof.

In the accompanying drawings, in which the same reference characters indicate the same parts in all of the views:

Fig. 1 is a side view of the improved tube cutting machine with parts broken away and in longitudinal section;

Fig. 2 is a fragmentary view taken on line 2—2 of Fig. 1 with a portion of the bed broken away and in section;

Fig. 3 is an enlarged, fragmentary, detail sectional view of the outer end portion of the mandrel showing the stock clamping jaws in retracted position;

Fig. 4 is a cross-sectional view taken on line 4—4 of Fig. 3 showing the knife or cutter associated with the mandrel in its inoperative withdrawn position;

Fig. 5 is an enlarged, fragmentary detail sectional view similar to Fig. 3 only showing the clamping jaws expanded for stock engaging purposes; and, Fig. 6 is a sectional view taken on line 6—6 of Fig. 5 with the associated cutter in its inner position relative to stock on the mandrel cut thereby.

Referring now more particularly to the drawings, it will appear that a supporting table or elevated frame for the tube cutting machine is indicated generally by the numeral 10 and said table includes an upper horizontal top 11 on which, at its outer end there is a fixed transverse bed 12 having a slot therein to accommodate a pinion 13. Reciprocatably mounted on the top surface of the bed 12 is a rack bar 14 having on its lower surface teeth 15 registering with the slot in the bed and engaged by the pinion 13. Through means later to be described, the rack bar 14 is adapted to be reciprocated transversely of the table top 11, moving on the top surface of the bed 12 on which it is slidably mounted through the tongue and groove connections 16. Mounted on the top of the rack bar 14, for removal when necessary but to normally move with the rack bar, and at the far side of the rack bar relative to Fig. 1, is an upright standard 17 adapted to replaceably hold, in a substantially horizontal position, a knife or cutter element 18. The standard 17 also has pivotally affixed thereto the inner end of a guard arm 19 whose outer end has revolubly mounted thereon a knife protecting roller 20. Rearwardly of the bed 12 and rack bar 14 the top 11 of the table supports a bracket 21 having revolubly mounted thereon stock engaging rollers 22.

Suitably journalled in the bed 12 and a table top-carried bearing 23, extending longitudinally of the table top 11, is an operating rod 24 which has fast thereon the previously mentioned pinion 13. An angularly projecting arm 25 fast on the rod 24 is engaged by the upper angled end of an upright connection 26. The inner end of a foot treadle 27 is hingedly mounted on a lower frame-carried supporting element 28 and intermediately said treadle pivotally engages the lower angled extremity of the connection 26. The arrangement is such that a downward movement of the foot treadle 27 exerts a down pull on the connection 26 to oscillate the rod 24 in the direction of the arrow in Fig. 2, turning the pinion 13 in the same direction to slide the rack bar 14 toward the left, relative to Fig. 2. Such depression of the foot treadle 27 is against the tension of a coiled spring 29 with the result that when pressure on the foot treadle is released, the spring will automatically return the foot treadle to its raised position and through the connection 26, the rod 24 will be oscillated in the opposite direction.

Mounted on the inner end of the table top 11 are upright bearing brackets 30 which rigidly support a horizontal, tubular mandrel 31.

A central shaft, which extends axially of the mandrel 31 and which projects beyond the inner end thereof, is indicated by the numeral 32. On roller bearings carried by the shaft 32 adjacent the inner end of the mandrel 31 is a cam 33 having a lateral lug 34 engaged by the upper angled end of a connection 35. The other extremity of said connection 35 is likewise angled and is pivotally engaged with an arm 36 fast on the inner end of the oscillatable arm 24, whereby motion is imparted to the cam 33. The inner end of the mandrel 31 adjacent the eccentric face of the cam 33, carries a U-collar 37 having revolubly mounted thereon cam rollers 38. Consequently, when, through the connections described, the cam 33 is turned so as to engage the high points of its cam surface with the rollers 38, the cam will reciprocate slightly toward the left, relative to Fig. 1, causing the cam 33 to abut against an idler pulley 39 which is revolubly mounted loosely on the shaft 32.

There is affixed to the inner face of the idler pulley 39 a clutch plate 40 and the initial axial movement of the idler pulley 39 causes the clutch plate 50 to compress a coiled spring 41 surrounding an outer end portion of the shaft 32 and bearing against a cap 43 which is fast to the outer end of said shaft 32. This reciprocates the shaft 32 to the left, relative to Fig. 1, for a purpose later to be described. Further movement of the pulley 39 toward the left on the shaft 32 causes the clutch plate 40 to frictionally engage the adjacent face of a clutch disc 44 which is secured fast relative to the shaft 32, causing said shaft to revolve by virtue of endless driving belts 45 engaging the pulley 39 and also engaging a pulley 46 on the shaft of an electric motor 47.

At the outer end of the shaft 32 there is operatively mounted on the shaft an expanding jaw assembly retained against outward axial displacement by a cap 48. Keyed to the shaft 32 is an annular wedge member 49 whose sleeve portion, at its inner end, has an outer, tapered surface 50 to wedgingly engage similarly tapered inner surfaces on the hub portions 51 of jaw segments 52. There is also keyed to the shaft 32 the hub portion of a bushing 53 having an outwardly offset annular portion which extends into recesses 54 therefor in the jaw segments 52. The jaw segments 52 are radially movably mounted on the offset portion of the bushing 53 by fillister head screws 55 located in enlarged recesses 56 therefor.

From the description thus far given of the expanding jaw assembly, it should be obvious that a reciprocation of the shaft 32 to the left, relative to Fig. 1, through the means previously described, is effective to cause movement of the wedge member 49 from its outer normal position of Fig. 3 to its inner jaw expanding position of Fig. 5.

In so moving, the wedge member 49 compresses a coiled spring 57 confined in a space between the flanged head of the wedge member 49 and an inturned annular flange on a casing member 58 which is in splined association with the wedge member 49. The jaw segments 52 are yieldingly held in their normal retracted positions by encircling band springs 59. When the wedge member 49 is moved inwardly to the position of Fig. 5, it forces the jaw segments 52 radially outwardly so that their outer knurled surfaces project beyond the outer periphery of the mandrel 31 to clampingly engage the inner surface of elongated cylindrical tube-forming stock 60 which had previously been axially slid onto the mandrel 31.

The numeral 61 indicates a stock stop and gauge whose main plate portion is adapted to be registered with the outer end of the stock 60, said plate portion being carried by an arm 62 mounted fast on the upper end of a shaft 63 journalled for rotation and for longitudinal adjustment in the frame. A turning movement imparted to the shaft 63 will be effective to swing the stop plate portion free of the outer end of the stock for removal of a severed tube or for insertion on the mandrel of the stock, while a longitudinal movement of the shaft 63 is effective to adjust the position of the stop and gauge for determining the length of tubes to be cut from the stock 60.

In the operation of the improved tube cutting machine, with the plate portion of the stop 61 initially swung to an out of the way position, the elongated extent of tube forming stock 60 is slid axially onto the mandrel 31. The stop member is then adjusted in accordance with the length of individual tubes desired and the tubing stock on the mandrel is then slid so as to abut the plate portion of the stop 61 which has been turned to its operative position, as in Fig. 1. A depression of the foot treadle 57 by the operator will be effective immediately, through the means previously described, to move the shaft 32 to the left, relative to Fig. 1, whereupon through the means previously described, the jaw segments 52 will be expanded outwardly radially to tightly engage the inner surface of the tubing stock 60, as in Fig. 5. Because of the engagement of the clutch plate 40 with the clutch disc 44, as previously described, the shaft 32 will then be rapidly revolved by the motor 47, also turning the stock 60 on the stationary mandrel. Further downward movement of the foot treadle 27 is effective through the connection 26, the rod 24, the pinion 13, and the rack teeth 15 to quickly move the rack toward the left, relative to Fig. 2, passing the edge of the cutter 18 through stock 60 to sever a tube of a desired length from the stock. In passing through the revolving stock, the edge of the cutter 18 will engage a hard block or pad of metal 64 (see Figs. 4 and 6) which provides metal to metal contact and insures a clean edge cut. Said metallic pad 64 is carried by the mandrel 31 immediately inwardly of the expanding jaws and in alinement with the path of movement of the cutter 18. Upon completion of the cut, the foot treadle is released and as a result, the clutch disc 44 is disengaged to break the drive to the shaft 32 and low portions of the surface of the cam 33 engage the rollers 38 with the result that the spring 41 will transmit an expanding force effective to reciprocate the shaft 32 toward the right relative to Fig. 1 and the wedge member 49 on the outer end of the shaft 32 is returned, under the influence of the spring 57 to the position of Fig. 3 which permits the retraction of the jaw segments 52. The stock 60, as well as the severed outer end thereof forming the tube, are released and upon movement of the stop 61 to an out of the way position, the cut tube may be quickly releaesd, whereupon the remaining extent of stock 60 is moved outwardly on the mandrel to abut the stop 61 and everything is in order for repeating the cycle. The cycle is repeated until all of the stock 60 has been severed into tubes whereupon a new extent of stock is mounted on the mandrel.

From the foregoing description, it will be seen that the improved tube cutting machine is easily operated, provides for the rapid severance of tubes of desired lengths from an elongated extent of stock, and is well adapted for the purposes described.

What is claimed as the invention is:

1. A tube cutting machine, comprising a mandrel for supporting an elongated extent of tubing stock from which individual tubes of a predetermined length are to be cut, means for releasably clamping the stock, means for rotating said stock, a cutter mounted laterally of the mandrel, means for moving the cutter back and forth into and out of the rotating stock, and a single lever controlling operation of said stock rotating means, said clamping means and said cutter moving means.

2. A tube cutting machine, comprising a mandrel for supporting an elongated extent of tubing stock from which individual tubes of a predetermined length are to be cut, means for releasably clamping the stock, means for rotating said stock, a cutter mounted laterally of the mandrel, means for moving the cutter back and forth into and out of the rotating stock, and a single lever controlling operation of said stock rotating means, said clamping means and said cutter moving means in sequential order.

3. A tube cutting machine, comprising a mandrel for supporting an elongated extent of tubing stock from which individual tubes of a predetermined length are to be cut, expanding jaws adjacent the mandrel for releasably engaging the stock, means for rotating said jaws and stock, a cutter mounted laterally of the mandrel, means for moving the cutter back and forth into and out of the rotating stock, and a common lever controlling operation of said rotating means, said jaws and said cutter moving means.

4. A tube cutting machine, comprising a stationary mandrel for supporting an elongated extent of tubing stock from which individual tubes of a predetermined length are to be cut, means spacedly and adjustably mounted adjacent the outer end of the mandrel forming a stock stop and gauge, expanding jaws revolubly mounted adjacent the mandrel for releasably engaging the stock, means for rotating said jaws and stock, a cutter mounted laterally of the mandrel, means for moving the cutter back and forth into and out of the rotating stock, and a common lever controlling operation of said rotating means, said jaws and said cutter moving means.

5. A tube cutting machine, comprising a mandrel for supporting an extent of tubing stock, means for releasably clamping the stock, means for rotating said stock, a cutter, means for moving said cutter into and out of the rotating stock, a hard metal pad carried by the mandrel in the path of movement of the cutter to be engaged by the latter after passing through the stock, and means for controlling the operations of said stock rotating means, said clamping means and said cutter moving means in synchrony.

6. A tube cutting machine, comprising a mandrel for supporting an elongated extent of tubing stock from which individual tubes of a predetermined length are to be cut, means spacedly and adjustably mounted adjacent the outer end of the mandrel forming a stock stop and gauge, expanding jaws revolubly mounted adjacent the mandrel for releasably engaging the stock, means for rotating said jaws and stock, a cutter mounted laterally of the mandrel, means for moving the cutter back and forth into and out of the rotating stock, a hard metal pad carried by the mandrel in the path of movement of the cutter to be contacted by the latter in passing through the stock, and a common lever controlling operation of said rotating means, said jaws and said cutter moving means in synchrony.

7. In a tube cutting machine, a tubular stock supporting mandrel, a shaft extending axially through said mandrel, the shaft being reciprocatable and rotatable relative to the mandrel, drive means extending to the shaft, expansile and contractile stock clamping jaws associated with the shaft, means carried by the shaft for operating said jaws and for controlling said drive means operated by reciprocatory movement of said shaft, and a cutter movable into and out of stock rotated on said mandrel.

8. In a tube cutting machine, a tubular, stock supporting, stationary mandrel, a shaft extending axially through said mandrel, the shaft being reciprocatable and rotatable relative to the mandrel, drive means extending to the shaft, expansile and contractile stock clamping jaws carried by the shaft, means carried by the shaft for operating said jaws and for controlling said drive means operated by reciprocatory movement of said shaft, a cutter, means for moving said cutter into and out of stock rotated by said clamping jaws, and common means for reciprocating said shaft and for operating said cutter moving means.

9. In a tube cutting machine, a tubular stock supporting mandrel, a shaft extending axially through said mandrel, the shaft being reciprocatable and rotatable relative to the mandrel, drive means extending to the shaft, expansile and contractile stock clamping jaws adjacent the mandrel, means carried by the shaft for operating and rotating said jaws and for controlling said drive means operated by reciprocatory movement of said shaft, a cutter, means for moving said cutter into and out of stock rotated by said clamping jaws, and a single control treadle for reciprocating said shaft and for operating said cutter moving means in timed relation.

10. In a tube cutting machine, a tubular stock supporting mandrel, a shaft extending axially through said mandrel, the shaft being reciprocatable and rotatable relative to the mandrel, drive means extending to the shaft, a clutch controlling said drive means, expansile and contractile stock clamping jaws carried by the shaft, means carried by the shaft for operating said jaws and said clutch, and a cutter movable into and out of stock rotated with said clamping jaws.

11. In a tube cutting machine, a tubular stock supporting mandrel, a shaft extending axially through said mandrel, the shaft being reciprocatable and rotatable relative to the mandrel, means for rotating said shaft, a clutch controlling operation of said rotating means, stock clamping jaws associated with the mandrel, jaw operating means carried by the shaft and operated by reciprocations of the latter, means for engaging and disengaging said clutch, engagement and disengagement of the clutch serving to reciprocate the shaft in reverse directions, and a cutter movable into and out of stock rotated by said clamping jaws with said shaft.

12. In a tube cutting machine, a tubular, stationary stock supporting mandrel, a shaft extending axially through said mandrel, the shaft being reciprocatable and rotatable relative to the mandrel, means for rotating said shaft, a clutch controlling operation of said rotating means, stock clamping jaws carried by the shaft, jaw operating means carried by the shaft and operated by reciprocations of the latter, means for operating said clutch, means effected by operation of the clutch for reciprocating said shaft, a cutter, a reciprocatable mounting for the cutter whereby the latter is movable into and out of stock rotated with said clamping jaws, and a common means for operating said clutch and for controlling operation of said reciprocatable mounting.

13. In a tube cutting machine, a frame, a stationary mandrel on which stock to be severed into tubes is mounted, said mandrel being supported by the frame, means for rotating stock on the mandrel, a clutch controlling said rotating means, a cutter carriage on the frame, means for reciprocating said cutter carriage in a path at right angles to the axis of the mandrel, an oscillating rod mounted on the frame and connected to both said clutch and said carriage reciprocating means for operating the same, and a manually operated member extending to said rod for oscillating it.

ORVILLE H. GITTER.

REFERENCES CITED

The following references are of record in the file of this patent:

UNITED STATES PATENTS

| Number | Name | Date |
|---|---|---|
| 1,491,140 | Holt | Apr. 22, 1924 |
| 1,581,051 | Gardner | Apr. 13, 1926 |
| 1,643,157 | Gardner | Sept. 20, 1927 |